United States Patent
Tvetene et al.

(10) Patent No.: US 6,296,063 B1
(45) Date of Patent: Oct. 2, 2001

(54) SOD HARVESTER

(76) Inventors: Donald Tvetene, 6844 S. Frontage Rd., Billings, MT (US) 59101; Michael Tvetene, 12 Willow Bend Dr. South, Billings, MT (US) 59102; Gregg Tvetene, 6844 S. Frontage Rd., Billings, MT (US) 59101

( * ) Notice: Subject to any disclaimer, the term of this patent is extended or adjusted under 35 U.S.C. 154(b) by 22 days.

(21) Appl. No.: 09/236,170

(22) Filed: Jan. 25, 1999

(51) Int. Cl.[7] .................................................. A01B 45/04
(52) U.S. Cl. ................................................ 172/19; 172/1
(58) Field of Search .................................. 172/1, 19, 20, 172/36; 414/540, 789.7, 791.6, 792, 792.4, 911; 294/86.4, 86.42, 107, 120, 127, 128, 126, 61

(56) References Cited

U.S. PATENT DOCUMENTS

| 54,050 | * | 4/1866 | Stephenson | 294/107 |
|---|---|---|---|---|
| 2,572,499 | * | 10/1951 | Light | 294/107 |
| 2,617,347 | | 10/1952 | Provost | 97/266 |
| 3,590,927 | * | 7/1971 | Brouwer | 172/19 |
| 4,073,532 | * | 2/1978 | Blair | 294/107 |
| 4,142,691 | * | 3/1979 | Watton | 172/19 |
| 4,294,316 | * | 10/1981 | Hedley et al. | 172/20 |
| 4,778,330 | * | 10/1988 | Mailleux et al. | 294/107 |
| 4,966,236 | * | 10/1990 | Hutchison | 172/20 |
| 5,217,078 | * | 6/1993 | Zinn | 172/19 |
| 5,230,602 | | 7/1993 | Schouten | 414/789.7 |
| 5,269,379 | * | 12/1993 | Millar et al. | 172/19 |
| 5,626,195 | * | 5/1997 | Dover | 172/19 |
| 5,697,760 | * | 12/1997 | Rosen | 414/789.7 |
| 5,775,436 | * | 7/1998 | Noyes, II et al. | 172/20 |
| 6,112,680 | * | 9/2000 | Hummer | 172/19 |

FOREIGN PATENT DOCUMENTS

| 789414 | * | 7/1968 | (CA) | 172/19 |
|---|---|---|---|---|
| 888588 | * | 12/1971 | (CA) | 172/19 |
| 2009096 | * | 6/1979 | (GB) | 294/61 |

OTHER PUBLICATIONS

Advertisement—"3 Machines in 1"—Bucyrus Eqpt. Co., *TPI Turf News* (Mar./Apr. 1997) p. 62.

Advertisement—"Texas Sod Harvester"—Texas Sod Harvesting Equipment, Inc., *TPI Turf News* (Mar./Apr. 1997) p. 29.

Advertisement—"Nothing Picks Up Profits Like a Brouwer" No Date.

* cited by examiner

*Primary Examiner*—Thomas B. Will
*Assistant Examiner*—Nathan Mammen
(74) *Attorney, Agent, or Firm*—Jacobson & Johnson

(57) ABSTRACT

A method and an automatic sod harvester for on-the-go cutting, rolling and storing of sod with the sod harvester including a sod cutter for freeing a section of sod from a sod field, a sod roller for rolling the section of sod into a sod roll, a sod roll accumulator having a sod troughs therein for receiving and holding a plurality of sod rolls therein and a sod roll pickup mechanism for lifting the sod rolls on the sod roll accumulator and transferring the sod rolls to a sod carrier for delivery of the sod rolls to a remote location.

14 Claims, 6 Drawing Sheets

SOD HARVESTER

FIELD OF THE INVENTION

This invention relates generally to sod harvesting equipment and more specifically to an on-the-go sod harvester that automatically cuts, rolls and stacks sod for machine pickup of the stacked sod.

BACKGROUND OF THE INVENTION

The concept of sod harvesting is old in the art. Typically, a sod slab is cut free from a sod field. The slab is then rolled up into a cylindrical roll that is transferred to a pallet or a sod pickup mechanism. If the sod rolls are "small rolls", the sod rolls can be manually transferred to a sod delivery truck that delivers the sod to the area where the sod rolls are to be laid. If the sod rolls are "big rolls", it is necessary to use equipment to both lift and transfer the sod rolls. Numerous devices are available for mechanizing portions of the sod harvesting and delivering process. For example, U.S. Pat. No. 5,230,602 shows a sod roll stacker for stacking rows of small rolls. Still other devices are available for cutting and rolling both small rolls and big rolls. The present invention comprises an apparatus and method that is suitable for automatic on-the-go cutting, rolling and stacking of small rolls of sod in a ready to transport condition.

SUMMARY OF THE INVENTION

Briefly, the present invention comprises a method of on-the-go cutting, rolling and stacking sod and an on-the-go sod harvester for automatically cutting, rolling and storing sod with the sod harvester including a sod cutter for freeing a section of sod from a sod field, a sod roller for rolling the section of sod into a sod roll, a sod roll accumulator having a set of sod troughs therein for receiving and holding the sod roll therein and a sod roll pickup mechanism for lifting the sod roll on the sod roll accumulator and stacking the sod roll on a sod carrier for later pick-up.

DESCRIPTION OF THE PREFERRED EMBODIMENT

Figure 1:
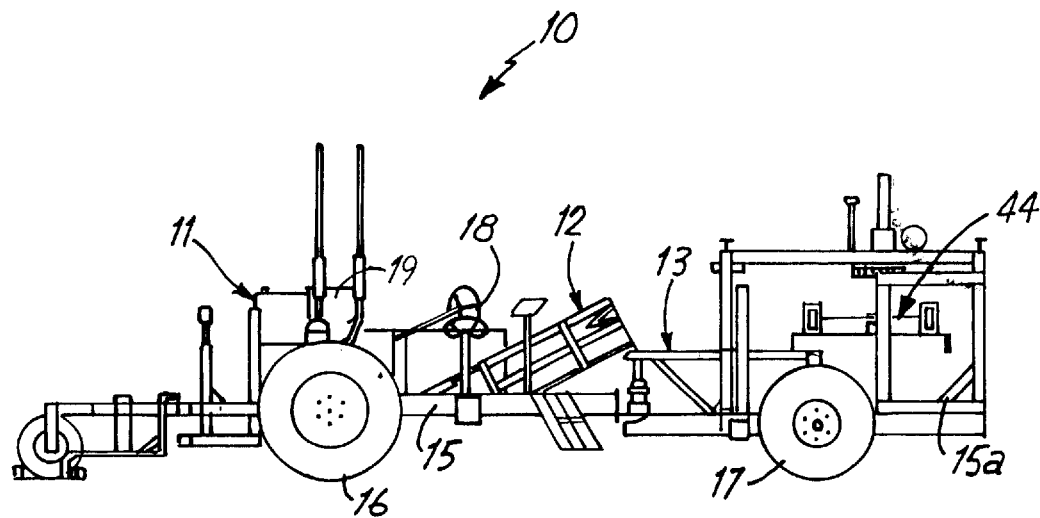
FIG. 1 is a side elevation of the on-the-go sod harvester for the automatic cutting, rolling and storing of sod.

FIG. 1 is a side view of the on-the-go sod harvester 10 for the automatic cutting, rolling and storing of sod. The sod harvester includes a sod cutting mechanism 11 for freeing a section of sod from a sod field, a sod roller 12 for rolling the section of sod into a sod roll, a sod roll accumulator 13 having sod troughs therein for receiving and holding the sod roll therein, a sod roll pickup mechanism 14 for lifting the sod roll onto the sod roll accumulator 13 and transferring the sod roll to a sod carrier 15a for delivery of the sod roll. The sod cutting mechanism 11, the sod roller 12, the sod roll accumulator 13, the sod pickup mechanism 14, and the sod carrier 15a are supported on a frame 15. The frame 15 has a set of front wheels 16 and a set of rear wheels 17 and an operator's console 18 together with a motor 19 for driving the sod harvesting machine over a sod field. A feature of the present invention is that the operator performs the function of driving the sod harvester over the turf field but the cutting, rolling and storing of sod are accomplished automatically without any required input from the operator. If desired, the operator can interfere with the automatic process and manually override portions of the process using the operator's console 18. However, in the preferred embodiment, the automatic operations are preferred since they require an operator with less skill.

Figure 2:
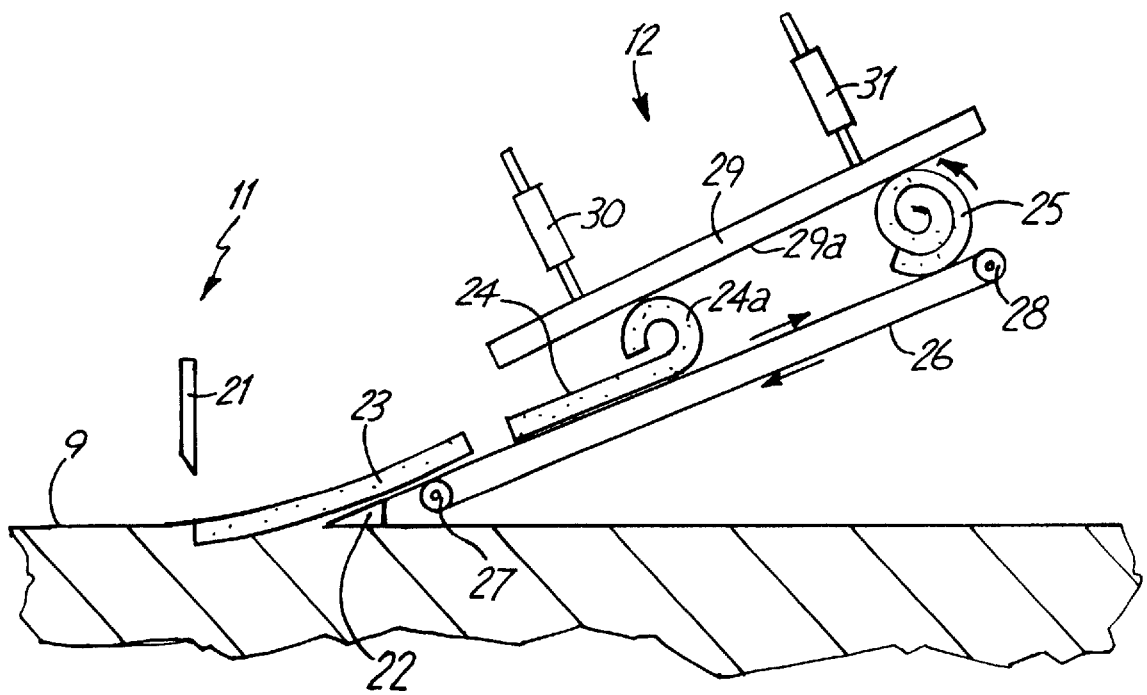
FIG. 2 is a partial schematic view showing the cutter and the sod roller for rolling a sod slab into a sod roll.

FIG. 2 is a partial schematic view showing the sod cutting mechanism 11 having a vertical cutoff blade 21 and a horizontal cutting blade 22 for freeing a slab of sod 23 from turf 9. A set of side cutters (not shown) free the edges of sod slab 23. The process and apparatus for cutting and freeing a slab of sod from a turf field is well known in the art FIG. 2 is a side view that illustrates the apparatus and process of rolling a sod slab into a sod roll. A sod slab 24 which has a partially rolled end 24a is shown on the lower end of sod roller 12. In operation, the sod slab 24 is elevated by a rotatable belt 26 that is located at an angle and is supported and driven by roller 28 which is powered by sod harvester 10. Located above sod belt 26 is a friction member 29 that is held in pressure engagement with the sod on belt 26 by the resilient members 30 and 31. Friction member 31 is free to move laterally toward and away from rotatable belt 26 but is prevented from moving in the direction of belt travel by restraining members (not shown). In operation of the sod roller 12, the underside 29a of member 29 frictionally engages the leading end of sod slab 24 to initiate rolling of sod slab into a roll as indicated by numeral 24a A further sod slab 25, which is located at the top of rotatable belt 26 is shown in a rolled condition. The rolled sod 25 is rotating in a counter clockwise direction, as indicated by the arrow, and will be elevated up and over the sprocket 28 so that the sod rolls can be dropped into the sod accumulator 13.

Figure 3:
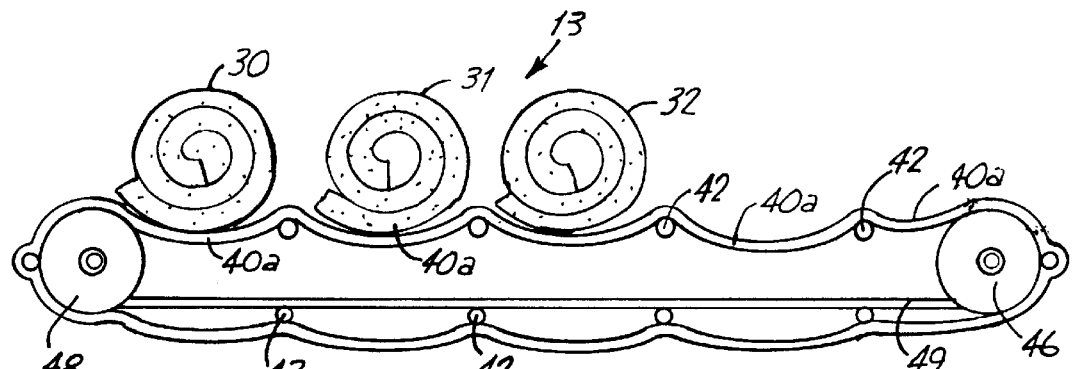
FIG. 3 shows a side view of the sod accumulator for receiving a set of sod rolls taken along lines 3—3 of FIG. 4.
Figure 4:
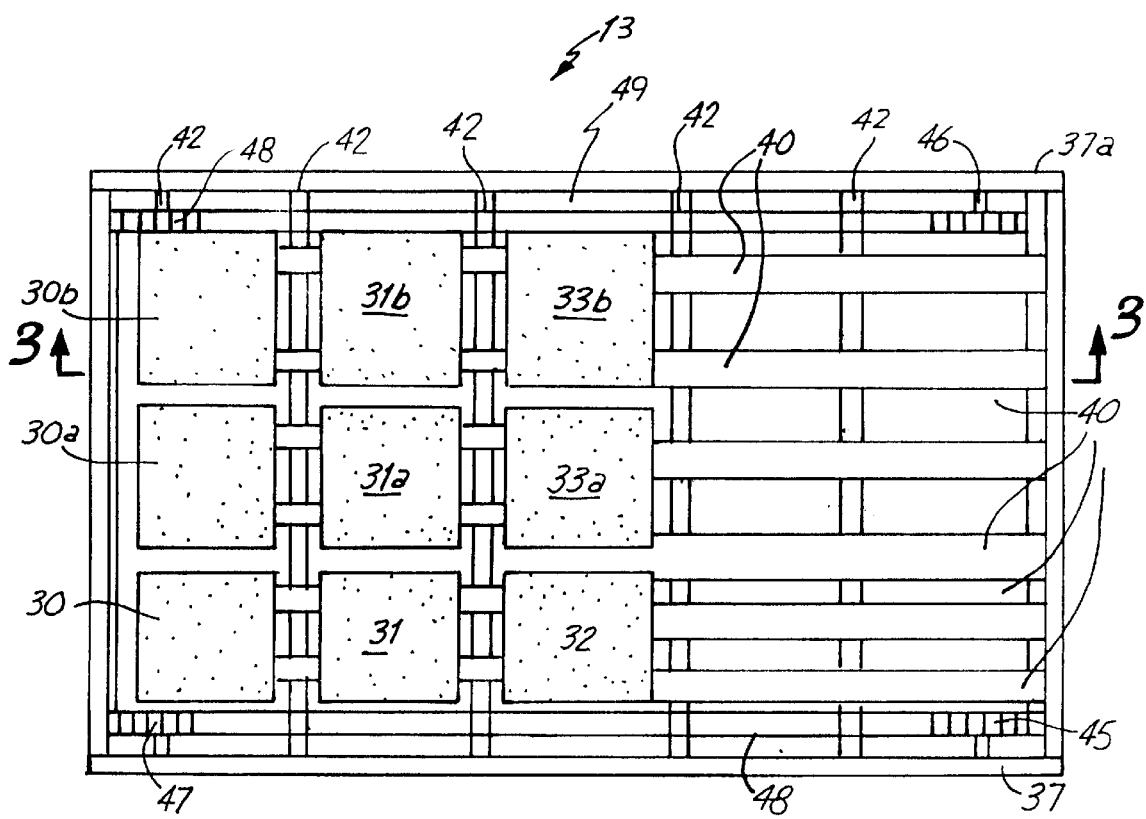
FIG. 4 shows a top view of the sod accumulator of FIG. 3.

FIG. 3 shows a side view of the sod accumulator 13 for receiving a set of sod rolls shown in FIG. 3 as taken along lines 3—3 of FIG. 4, which shows a top view of the sod accumulator 13. The sod roll accumulator 13 includes a plurality of flexible belts 40 that are supported at spaced, lateral intervals by fixed engagement with cross members 42. The belts hang down between the cross members 42 to form a set of parallel spaced sod troughs 40a for receiving and holding a plurality of sod rolls in side by side and end to end condition. A first chain 49 engages one end of bars 42 and a second chain 48 engages the opposite end of bars 42 with one end of bar 42 supported by a track 37a and the other end of the bars 42 supported by a track 37. A first drive roller 46 and a second drive roller 45 intermittently rotate belts 40 through a power mechanism (not shown). In operation of the sod roll accumulator 13, the belts 40 are stationary as the sod rolling mechanism 11 drops a roll of sod into the sod trough 40a on the left end of sod accumulator 13. Once sod trough 40a is filled with a row of sod rolls 30,30a and 30b the drive mechanism rotates the drive chains 48 and 49 sufficiently to move sod rolls 30,30a and 30b into the spatial position occupied by sod rolls 31,31a, and 31b. Similarly sod rolls 31,31a, and 31b are moved into the spatial position occupied by sod rolls 32, 32a and 32b and sod rolls 32, 32a and 32b are moved into the spatial position to the right of sod roll 32. Thus, each of the sod rolls advance one position, thus freeing the sod trough 40a proximate the right end of roller 48 to receive another row of sod rolls. This process continues until all the accumulator sod troughs 40a are filled with sod rolls. When the sod troughs 40a are filled with sod rolls, the sod rolls are in a ready condition to be transferred and stacked. In the embodiment shown, the flexible belts 40 extend downward in a catenary curve between adjacent bars 42.

It will be envisioned that sod harvesting including the cutting, rolling and accumulation of sod rolls is accomplished while the sod harvester 10 is on-the-go and without operator input. That is, as sod harvester 10 moves forward, the sod slab is cut, rolled and stored without the necessity of having the operator manually perform any of the steps of the sod harvesting operation.

While the invention is shown with multiple sod rolls in each of the troughs in the accumulator, it is envisioned that a single sod roll could be placed in each trough. In addition although five troughs are shown, it is further envisioned that one or more sod troughs could be used in my sod accumulator.

Figure 5:
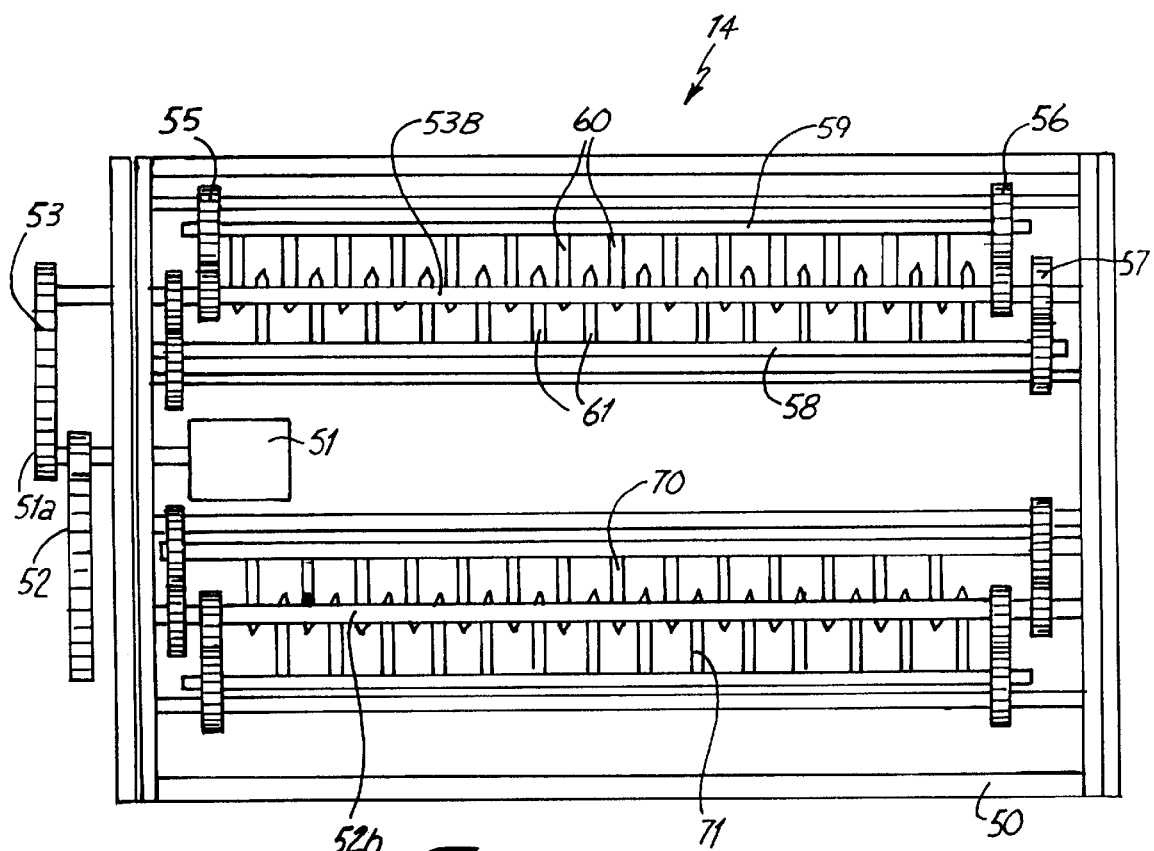
FIG. 5 shows a top view of the sod roll pickup mechanism with the retractable spikes for piercing engagement with a set of sod rolls.

FIG. 5 shows a schematic top view of the sod roll pickup mechanism 14 which includes a frame 50 with a first set of retractable spikes comprised of a first row of spikes 60 and a second row of spikes 61 and a second set of retractable spikes comprised of a first row of spikes 70 and a second row of spikes 71. The retraceable spikes are slideable laterally along guides (not shown) to form a piercing engagement with a set of sod rolls located on accumulator 13.

The retractable spikes are extended and retracted by a power drive mechanism 51 that is mounted on frame 50. Power drive mechanism 51 rotates a double sprocket wheel 51a which is connected to sprocket wheel 53a through chain 53 and similarly to sprocket wheel 52a through chain 52.

Figure 6:
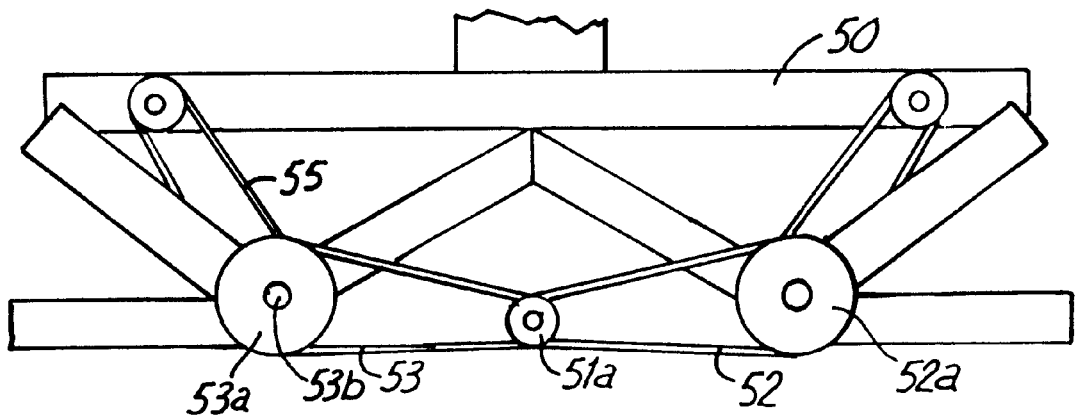
FIG. 6 is a side view showing the sod roll pickup mechanism with the retractable spikes in the retracted position.
Figure 7:
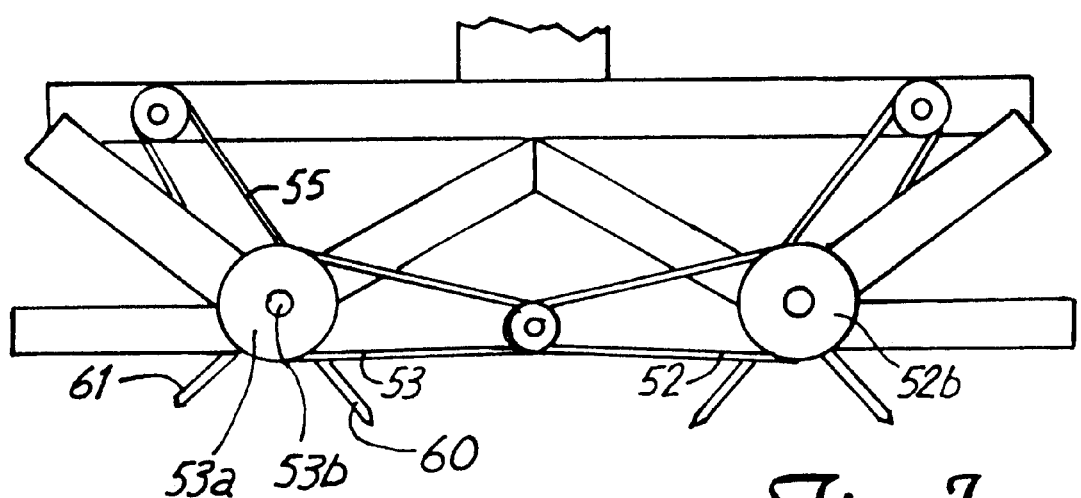
FIG. 7 is a side view showing the sod roll pickup mechanism with the retractable spikes in the extended position.

In operation of the sod roll pickup mechanism 14, the sprocket wheel 51a is rotated in a first direction to extend the retractable spikes and in the opposite direction to retract the retractable spikes. FIG. 6 is a side view showing the sod roll pickup mechanism 14 with the two sets of retractable spikes in the retracted position and FIG. 7 is a side view showing the sod roll pickup mechanism 14 with the retractable spikes in the extended position.

Figure 8:
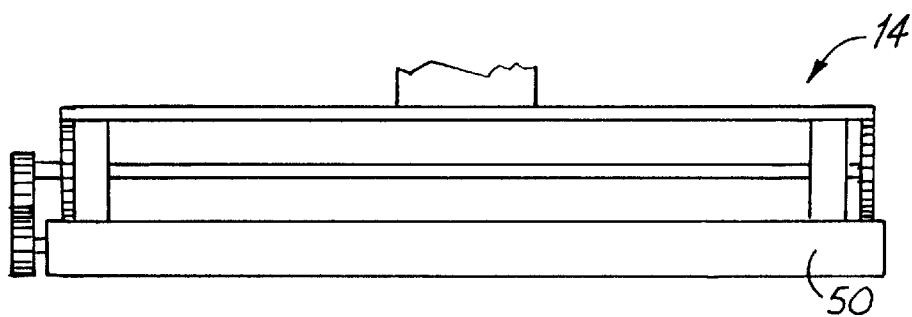
FIG. 8 is an end view of the sod roll pickup mechanism with the retractable spikes in the retracted condition.

In the operation of the sod roll pickup mechanism, the rotation of sprocket wheel 51a simultaneously rotates chain 53 and chain 52. The rotation of chain 53 in a first direction causes rotation of sprocket wheel 53a which in turn rotates shaft 53b. The rotation of shaft 53b rotates chains 55, 54, 56 and 57. As one set of spikes are mounted to the upper portion of the rotating chains and the other to the lower portions of the rotating chains the rotation of the chains cause the set of spikes to extend and retract in unison. A first bar 59 connected to chains 55 and 56 holds retractable spikes 60 and a second bar 58 connects to chains 57 and 54 so that rotation of chains 54, 55, 56, and 57 slides spikes 60 and 61 downward to the position shown in FIG. 7. The rotation of chain 53 in the opposite direction causes rotation of sprocket wheel 53a in the opposite direction which in turn rotates shaft 53b in the opposite direction. The rotation of shaft 53b in the opposite direction also rotates chains 55, 54, 56 and 57 in the opposite direction. Consequently, the first bar 59 which is connected to chains 55 and 56 slides upwards to retract retractable spikes 60 and the second bar 58 which is connects to chains 57 and 54 also slides upward so that rotation of chains 54, 55, 56, and 57 in the opposite direction moves spikes 60 and 61 upward into the position shown in FIG. 7. As the two sets of retractable spikes operate in an identical manner, only one set of retraceable spikes is described herein. Each set of spikes comprises cylindrical members having a pointed end for piercing the sod roll. The spikes are spaced sufficiently close so that multiple spikes will engage a sod roll to hold the sod roll during the pickup and transfer process FIG. 8 is an end view of the sod roll pickup mechanism 14 with the retractable spikes in the retracted condition. It should be pointed out that the sod roll pickup mechanism is an overhead mechanism for picking up sod rolls from above rather than from below.

Figure 9:
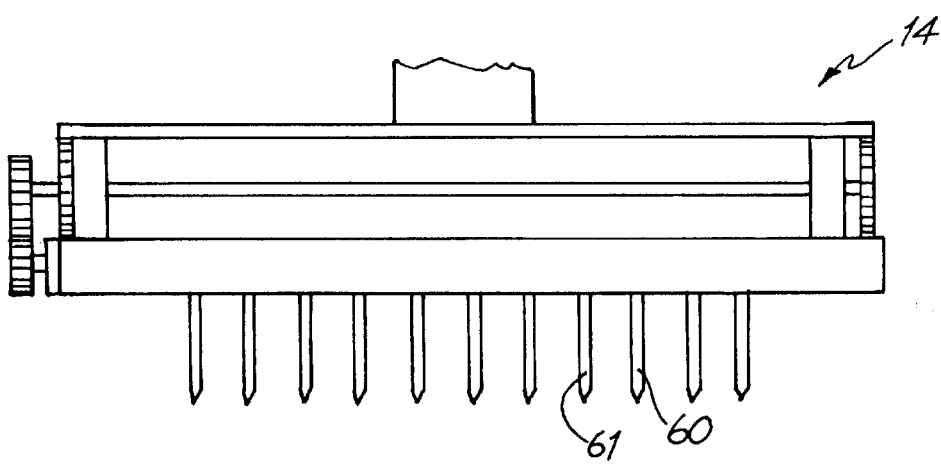
FIG. 9 shows an end view of the sod roll pickup mechanism in the extended position.

FIG. 9 shows an end view of the sod roll pickup mechanism 14, while empty.

Figure 10:
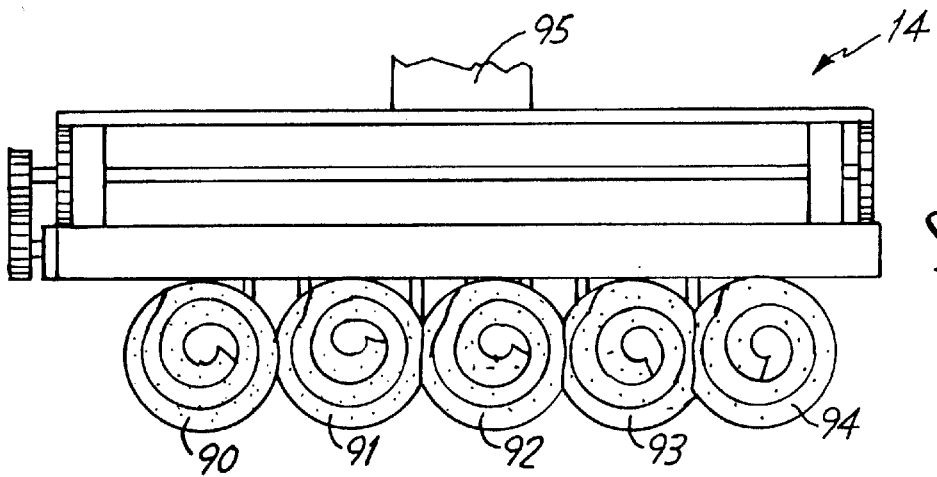
FIG. 10 is the end view of the sod roll pickup mechanism shown in FIG. 9 with a plurality of sod rolls suspended thereunder.

FIG. 10 is the end view of the sod roll pickup mechanism 14 shown in FIG. 9 with a plurality of sod rolls 90, 91, 92, 93 and 94 suspended thereunder for movement and placement of the sod rolls on a stack. In operation of sod roll pickup mechanism 14, the sod roll pickup mechanism 14 is normally located in the open condition illustrated in FIG. 8. Next, the sod roll pickup mechanism is lowered onto the top of a layer of sod rolls that are located on the sod roll accumulator 13.

FIG. 10 shows the sod roll pickup mechanism 14 located on top of sod rolls 90, 91, 92, 93 and 94. Once the sod rolls are in position, the sets of retractable spikes 60, 61, 70 and 71 are extended downward at an angle to pierce the sod rolls in both the horizontal and vertical directions. That is, the spikes extend angularly into the rolls of sod to hold the sod rolls as a unit in the sod roll pickup mechanism so that a lifting head 95 can lift the sod roll pickup mechanism and the sod rolls and place the sod rolls on a carrier. Once placed on a carrier, the sets of retractable spikes are retracted to leave the sod rolls in a neat layer of sod rolls on a pallet or the like.

Figure 11:
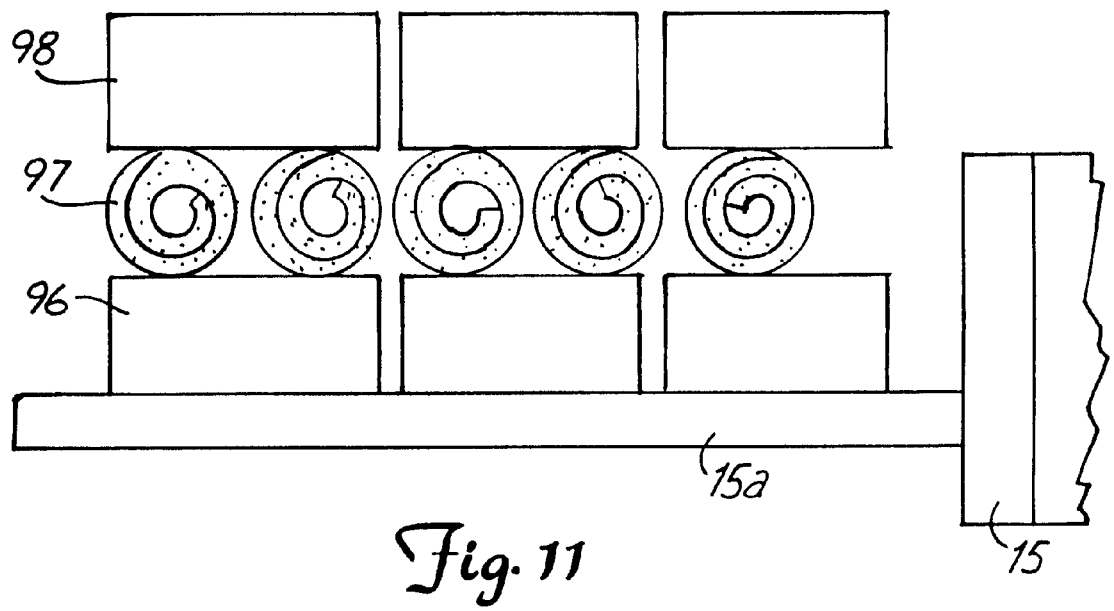
FIG. 11 shows the sod rolls stacked in alternate layers on the on-the-go sod harvesting machine of FIG. 1.

FIG. 11 shows the sod rolls stacked with the central axis of each level of sod rolls is in a perpendicular arrangement with the sod rolls above and below it. That is, layers 96, 97 and 98 are located on sod carrier 15a which is attached to frame 15, but the axis of the rolls of each layer of sod rolls is oriented at a right angle to the layer of sod rolls adjacent thereto. Sod carrier 15a can (if desired) include a pallet so that a stack of sod rolls can be placed on the ground for pallet pickup by another vehicle such as a forklift or the like.

Figure 12:
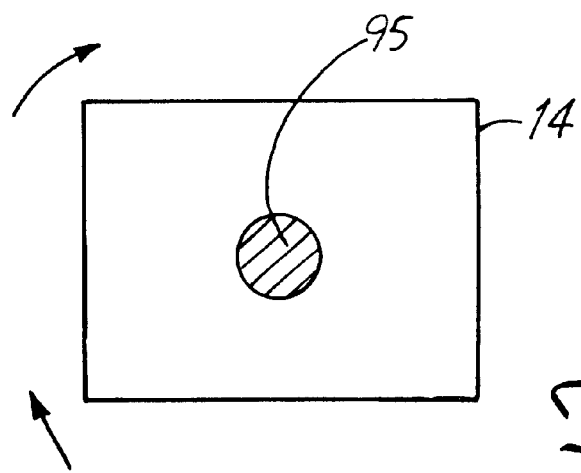
FIG. 12 is a schematic mechanism to indicate the axial rotation of the sod pickup mechanism to enable placement of sod rolls in alternate rows.

FIG. 12 is a schematic mechanism to indicate the axial rotation of the sod pickup mechanism 14, which includes a positioning member for both lifting, moving and rotating the sod roll pickup mechanism to enable placement of sod rolls in a stack with the axis of the sod rolls extending perpendicular to each other as shown in FIG. 11.

With the present invention, the cutting and rolling of the sod occurs continuously, while the storing of sod rolls involves the intermittent operation of the sod accumulator to move sod rolls into a temporary storage position. Similarly, the transfer of sod rolls to the stack occurs intermittently since the sod rolls are only transferred to the sod stack when the accumulator is full of sod rolls.

It should be noted that this process of cutting, rolling and storing of sod is entirely automated and requires no special commands from the operator of the vehicle, but, if desired, each and every step can be manually overridden and controlled by an operator through the interface 18.

We claim:

1. A sod harvester for on-the-go cutting, rolling and storing of sod comprising:

a sod cutter for freeing a section of sod from a sod field;

a sod roller for rolling the section of sod into a sod roll;

a sod roll accumulator, said sod roll accumulator having a sod trough therein for receiving and holding the sod roll therein;

a frame, said frame extending in a lateral direction;

a sod roll pickup mechanism mounted on said frame, said sod roll pickup mechanism for lifting the sod roll on the sod roll accumulator and transferring the sod roll to a sod carrier said sod roll mechanism including a first set of straight retable spikes, said first set of straight retractable spikes linearly retractable to a non-sod engaging position and extendible below the frame in a first horizontal and vertical direction into a sod-roll engaging condition said sod roll mechanism including a second set of straight retractable spikes, said second set of straight linearly retractable spikes retractable to a non-sod engaging position and extendible below the frame in a second horizontal and vertical direction different from the first horizontal and vertical direction to a sod-roll engaging condition whereby the first set of straight retractable spikes and said second set of straight retractable spikes coact to pierce the sod roll at different angles over an extended lateral area to enable the sod roll pickup mechanism to vertically lift the sod roll from said sod roll accumulator, the sod roll pickup mechanism releasing said sod roll by the retraction of the first set of retractable spikes and the second set of retractable spikes to the non-sod engaging position.

2. The sod harvester of claim 1 wherein said sod roll accumulator comprises a set of flexible belts held in a slack condition to form a set of said sod troughs.

3. The sod harvester of claim 2 wherein the sod roll accumulator includes a dive member for intermittently advancing the flexible belts in the sod roll accumulator to a position to receive further sod rolls.

4. The sod harvester of claim 1 wherein the sod roll accumulator includes a drive member for advancing the sod roll accumulator to a position to receive further sod rolls.

5. The sod harvester of claim 1 wherein the sod roll pickup mechanism includes a set of drive chains for driving said first set of straight retractable spikes and said second set of straight retractable spikes into the sod engaging position and driving said first set of retractable spikes and said second set of retractable spikes into the non-sod engaging position.

6. The sod harvester of claim 5 herein the sod roll pickup mechanism includes at least two sets of straight spikes.

7. The sod harvester of claim 5 wherein the set of drive chains are driven by a set of sprocket wheels.

8. The sod harvester of claim 1 wherein the sod roll pickup mechanism includes a rotatable member for rotating the sod roll pickup mechanism ninety degrees to enable the sod roll pickup mechanism to stack layers of sod rolls with the axis of the layers of sod rolls extending at right angles to one another.

9. The sod harvester of claim 1 wherein said sod roller for rolling sod includes an elevating ramp for elevating the sod roll and then dropping the sod roll into said sod trough.

10. The sod harvester of claim 1 including at least two sod rolls positioned within the sod trough of the sod accumulator with a cylindrical axis of the sod rolls extending at a perpendicular to a side of the sod roll accumulator so as to allow the first set of straight retractable spikes and the second set of straight retractable spikes to engage the sod rolls through a general axial alignment of the first set of retractable spikes and the second set of retractable spikes with the cylindrical axis of the sod rolls.

11. The method of on-he-go harvesting of sod comprising the steps of:

cutting a slab of sod;

rolling the cut slab of sod into a sod roll;

placing the sod roll onto a sod accumulator while waiting for at least one more roll of sod to be placed in the sod accumulator to form a plurality of sod rolls;

placing a frame y a first set of spikes and a second set of spikes on top of the plurality of sod rolls;

piercing the plurality sod roll with the first set of spikes by non-rotational inserting the first set of spikes at a first non-normal angle into the plurality of sod rolls in both a horizontal and vertical direction and the second set of spikes by non-rotational inserting the second set of spikes at a second non-normal angle into the plurality of sod rolls in both a horizontal and vertical direction whereby the first set of spikes and said second set of spikes extend below the frame to engage the plurality of sod rolls to thereby place the plurality of sod roll in a condition for lifting; and removing the plurality of sod rolls from the sod accumulator by lifting the plurality of sod rolls upward with only said first set of retractable spikes and said second set of retraceable spikes and stacking the plurality of sod rolls.

12. The method of claim 11 including the step of removing the plurality of sod rolls from the sod accumulator includes lifting the plurality of sod rolls from a position above the sod accumulator.

13. The method of claim 12 including the step of stacking the plurality of sod rolls in a first layer with the axis of the sod roll located in a fist direction and stacking a further plurality of sod rolls in an adjacent layer with the axis of the plurality of sod rolls in the adjacent layer located at a right angle to the axis of sod rolls in the plurality of sod rolls in a first layer.

14. The method of claim 11 wherein the step of accumulating sod rolls comprises placing sod rolls on a set of slack belts that form catenary shaped troughs for maintaining the sod rolls therein and then periodically moving the slack belts to permit placing a further row of sod rolls on the set of slack belts.

* * * * *